United States Patent
Gehre et al.

[19]

[11] Patent Number: 6,040,640
[45] Date of Patent: Mar. 21, 2000

[54] DIRECT VOLTAGE BACK-UP SYSTEM AT A POWER SUPPLY OUTLET

[75] Inventors: Hans-Joachim Gehre, Chemnitz; Frank Winterstein, Nuernberg, both of Germany

[73] Assignee: Siemens Aktiengesellschaft, München, Germany

[21] Appl. No.: 09/066,474

[22] PCT Filed: Oct. 23, 1996

[86] PCT No.: PCT/DE96/02011

§ 371 Date: Jun. 18, 1998

§ 102(e) Date: Jun. 18, 1998

[87] PCT Pub. No.: WO97/15976

PCT Pub. Date: May 1, 1997

[30] Foreign Application Priority Data

Oct. 26, 1995 [DE] Germany ............ 195 39 928

[51] Int. Cl.[7] .................................................. H02J 7/00
[52] U.S. Cl. ........................ 307/66; 307/48; 307/141; 307/141.4
[58] Field of Search .................... 307/64, 65, 66, 307/125, 130, 131, 44, 48, 49, 80, 85–87, 141, 141.4; 320/30, 137, 165, 119; 322/88; 340/636

[56] References Cited

U.S. PATENT DOCUMENTS

| | | | |
|---|---|---|---|
| 4,382,221 | 5/1983 | Reynolds | 320/35 |
| 5,013,993 | 5/1991 | Bhagwat et al. | 320/35 |
| 5,191,231 | 3/1993 | Berry | 307/142 |
| 5,289,046 | 2/1994 | Gregorich et al. | 307/66 |
| 5,332,927 | 7/1994 | Paul et al. | 307/66 |
| 5,488,283 | 1/1996 | Dougherty et al. | 307/66 |
| 5,528,087 | 6/1996 | Sibata et al. | 307/66 |
| 5,612,580 | 3/1997 | Janonis et al. | 307/64 |
| 5,698,965 | 12/1997 | York | 320/30 |
| 5,739,596 | 4/1998 | Takizawa et al. | 307/66 |
| 5,777,454 | 7/1998 | McAndrews et al. | 307/64 |
| 5,783,927 | 7/1998 | Chen | 320/110 |
| 5,844,328 | 12/1998 | Furst | 307/66 |

FOREIGN PATENT DOCUMENTS

| | | |
|---|---|---|
| 460 888 | 12/1991 | European Pat. Off. . |
| 39 23 919 | 1/1990 | Germany . |
| 43 40 350 | 6/1995 | Germany . |
| 5106292 | 11/1994 | Japan . |
| 5144780 | 1/1995 | Japan . |
| 2241394 | 8/1991 | United Kingdom . |
| WO 88/00896 | 2/1988 | WIPO . |

OTHER PUBLICATIONS

"The Always Ready," EET, Jan. 1994, pp. 44, 46.

*Primary Examiner*—Jeffrey Gaffin
*Assistant Examiner*—Peter Zura
*Attorney, Agent, or Firm*—Kenyon & Kenyon

[57] ABSTRACT

A back-up device includes at least one back-up battery, in particular a rechargeable battery which can be charged via the power supply, and a control unit. The control unit connects the back-up battery when the actual value of the DC voltage is less than a predefined minimum value, generates a predefined back-up time period and disconnects the back-up battery again, cyclically, after this time period has elapsed. The device has the advantage that the return of the output DC voltage of the power supply can be identified effectively without major complexity. The loads continue to be supplied both in the event of a failure of the supplying input voltage and in the event of a failure of the power supply, since the output DC voltage, which is essential for the loads, of the power supply is monitored. The device can be connected additively downstream of a power supply, without any intervention in its design being necessary. The device has the further advantage that it automatically connects the battery as a back-up, even in the event of dips in the output DC voltage caused by short-circuits, as soon as the load voltage falls below the minimum value. Thus, the device allows a virtually continuous transfer and back-up of the output DC voltage in a multiplicity of fault situations.

8 Claims, 3 Drawing Sheets

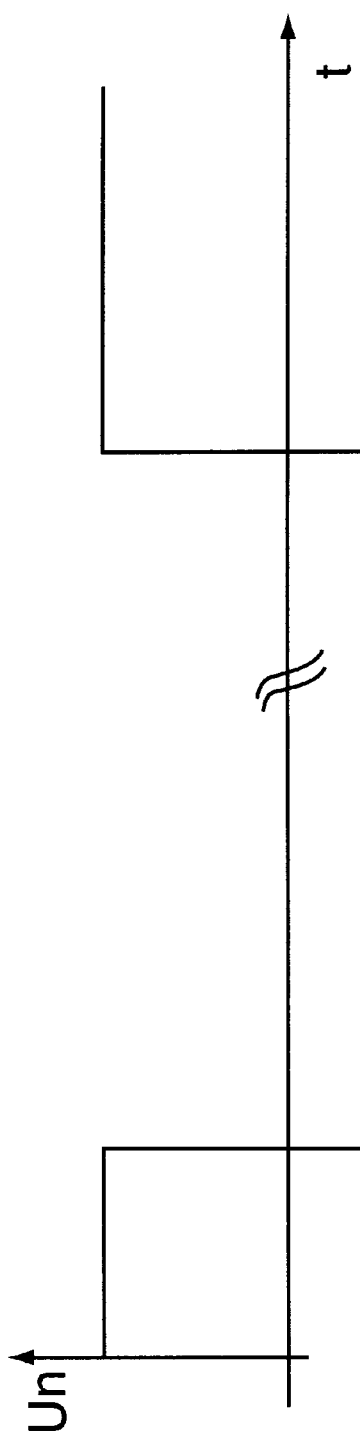
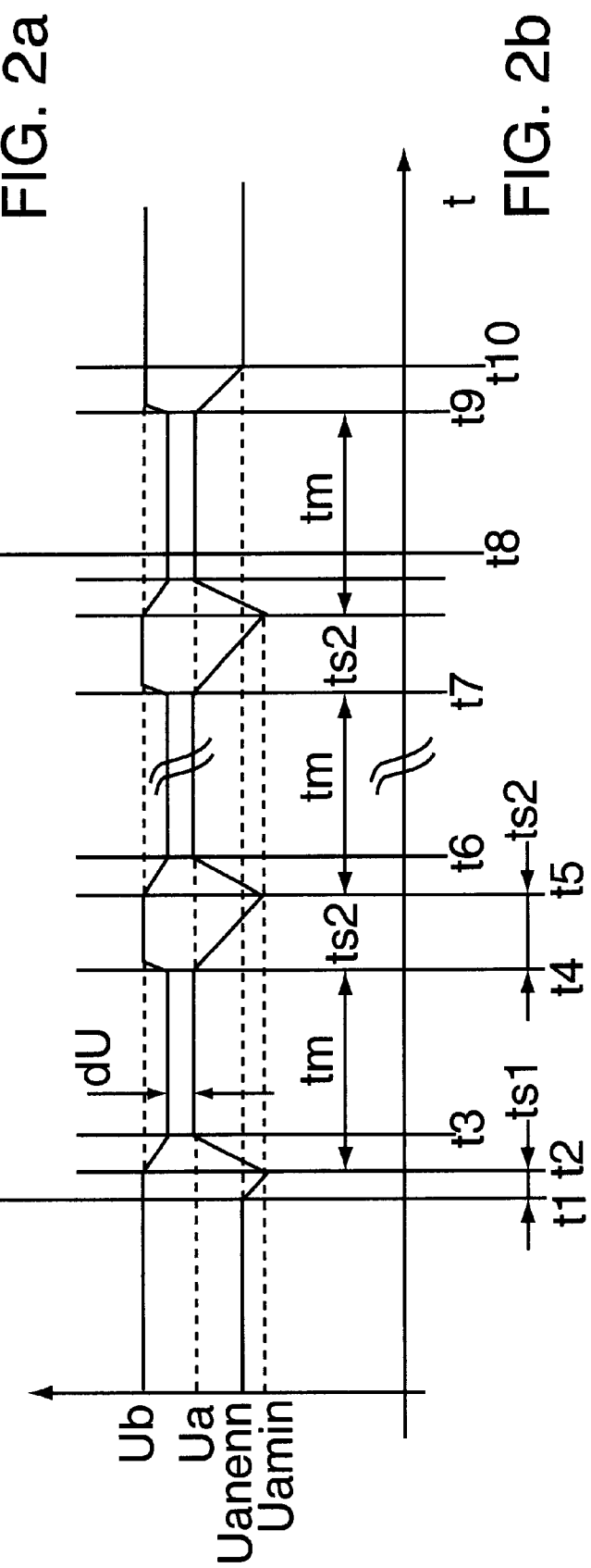

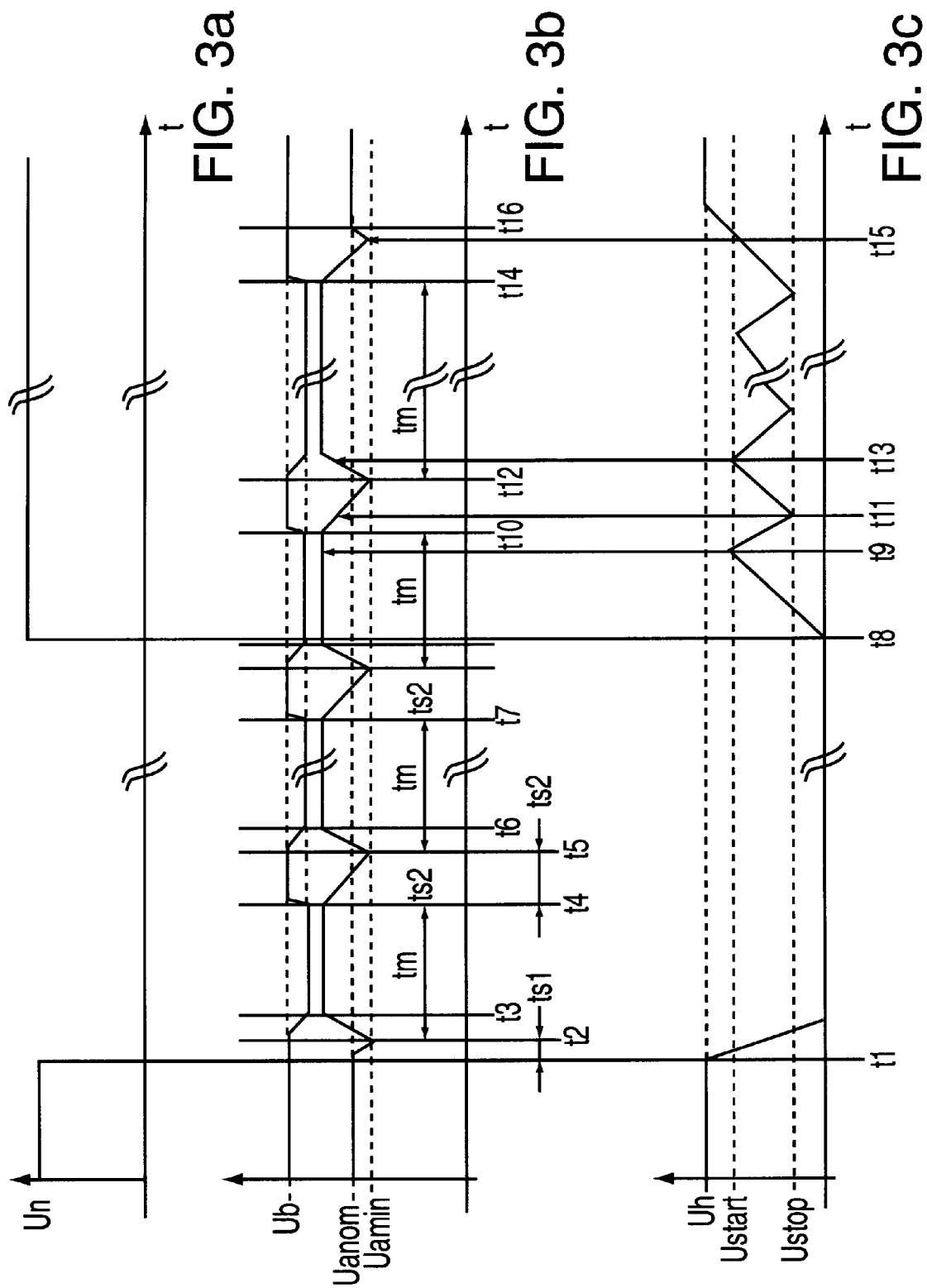

6,040,640

DIRECT VOLTAGE BACK-UP SYSTEM AT A POWER SUPPLY OUTLET

FIELD OF THE INVENTION

The present invention relates to a device for backing-up a d.c. voltage at an output of a power supply.

BACKGROUND OF THE INVENTION

When loads are supplied via a mains-operated power supply, precautions are normally taken for the situation in which the power line system which drives the power supply fails briefly. As a rule, such a power line system is an AC power line system. Alternatively, it may also be a DC mains system.

The failure of the supplying power line system, or its voltage falling below a specific value, is, as a rule, identified and reported by special detection devices at the input of the power supply. These devices then, for example, connect a battery to the loads, using a relay or a semiconductor switch. As soon as the supplying mains system has reached a specific voltage value again, the switch is opened again. Furthermore, power supplies are frequently intended to be designed such that they provide an output DC voltage which is safely isolated from the supplying power line system at the input. This is the case, in particular, when the mains system is a 400 V or 230 V AC mains system. Here, it may be necessary for the power supply to emit a so-called SELV DC voltage in accordance with EN 60950 (EN: European standard) for example with a value of 24 V (SELV: Safety Extra Low Voltage).

In such a case, it is also necessary for the detection device for the voltage which is monitored on the power line system input side to satisfy the requirements for safe isolation. This is disadvantageous since the large air gaps and leakage paths required, inter alia, for this purpose necessitate an increased cost and space outlay, and correspondingly costly components.

A further disadvantage of direct detection of the supplying power line system voltage on the input side of the power supply is that, in the event of a failure of the power supply itself, the battery is not connected since the detection device in it does not identify a fault because the power line system voltage is present without any change. However, because of the high stress in terms of current, voltage and temperature, power supplies are among the particularly severely stressed devices and therefore, as a rule, fail earlier than most of the loads supplied by them. Such devices therefore do not identify, for example, failure of the drive of the primary transistors, the power supply transiently not running up, or any component or a connection in the primary or secondary circuit becoming open circuit. The battery is connected only in the particularly serious case in which the power supply fails as a result of a primary short-circuit and an upstream automatic protection device disconnects the supplying power line system as a consequence of this.

A further problem is that many loads on the DC side require high starting currents, for example on connection, for example incandescent lamps, DC/DC converters, capacitors, DC motors, switching contactors with a DC economy winding and the like. Some power supplies disconnect immediately in the event of an overload. This is disadvantageous since a sudden, complete interruption occurs in the supply to the load. Other power supplies have automatic current limiting, as a result of which the output voltage collapses in accordance with Ohm's Law $U = R_{load} \times I_{current\ limiting}$. Here, the loads are supplied with an unacceptably low voltage in a disadvantageous manner for the time period of the voltage dip caused by high starting currents.

In conventional circuits, the return of the output DC voltage of the power supply can be identified, independently of the power line system input voltage by a diode which is connected in the output line, which carries the positive potential, between the power supply and the load. The load voltage, for example the 24 V output DC voltage of the power supply less the forward voltage of the diode V1 when the battery is disconnected or the battery voltage when the battery is connected, is present on the cathode of this diode. The actual output DC voltage of the power supply can be detected on the anode of the diode. If the power supply is not supplying any output voltage, then the voltage at the anode of the diode is virtually 0 volts. A control signal can be derived from this which maintains the connection of the battery. If the voltage at the anode rises above a predetermined value, the battery is disconnected from the loads again to prevent it from being unnecessarily discharged. In the steady state, the diode thus makes it possible to distinguish with certainty whether the DC voltage on the load is being provided by the power supply or the battery. The disadvantage associated with using such a diode is the occurrence of a voltage drop, caused by the output DC voltage, of about 1 volt, a high power loss, and an increased space requirement for a large heat sink.

SUMMARY OF THE INVENTION

An object of the present invention is to provide a more universal device for backing up the DC voltage at the output of a power supply which, on the one hand, is to be designed without major complexity and, on the other hand, provides that the output DC voltage is backed up even in the event of a failure of the power supply itself and in the event of overloads at the output side of the power supply.

BRIEF DESCRIPTION OF DRAWINGS

FIG. 2a shows a profile of essential voltages of the device according to the present invention during a backing-up process, using the example of a power supply which has an internal auxiliary voltage supply for a regulator of an output DC voltage.

FIG. 2b shows further details of the profile of the essential voltages shown in FIG. 2a of the device.

FIG. 3a shows another profile of the essential voltages of the device during a backing-up process, using the example of a power supply which has a storage capacitor for the auxiliary voltage supply for the starting up of the regulator of the output DC voltage.

FIG. 3b shows further details of the profile of the essential voltages of the device (shown in FIG. 3a) during a backing-up process.

FIG. 3c shows further details of the profile of the essential voltage (shown in FIG. 3a and 3b) of the device during a back-up process.

DETAILED DESCRIPTION OF THE INVENTION

Figure 1:
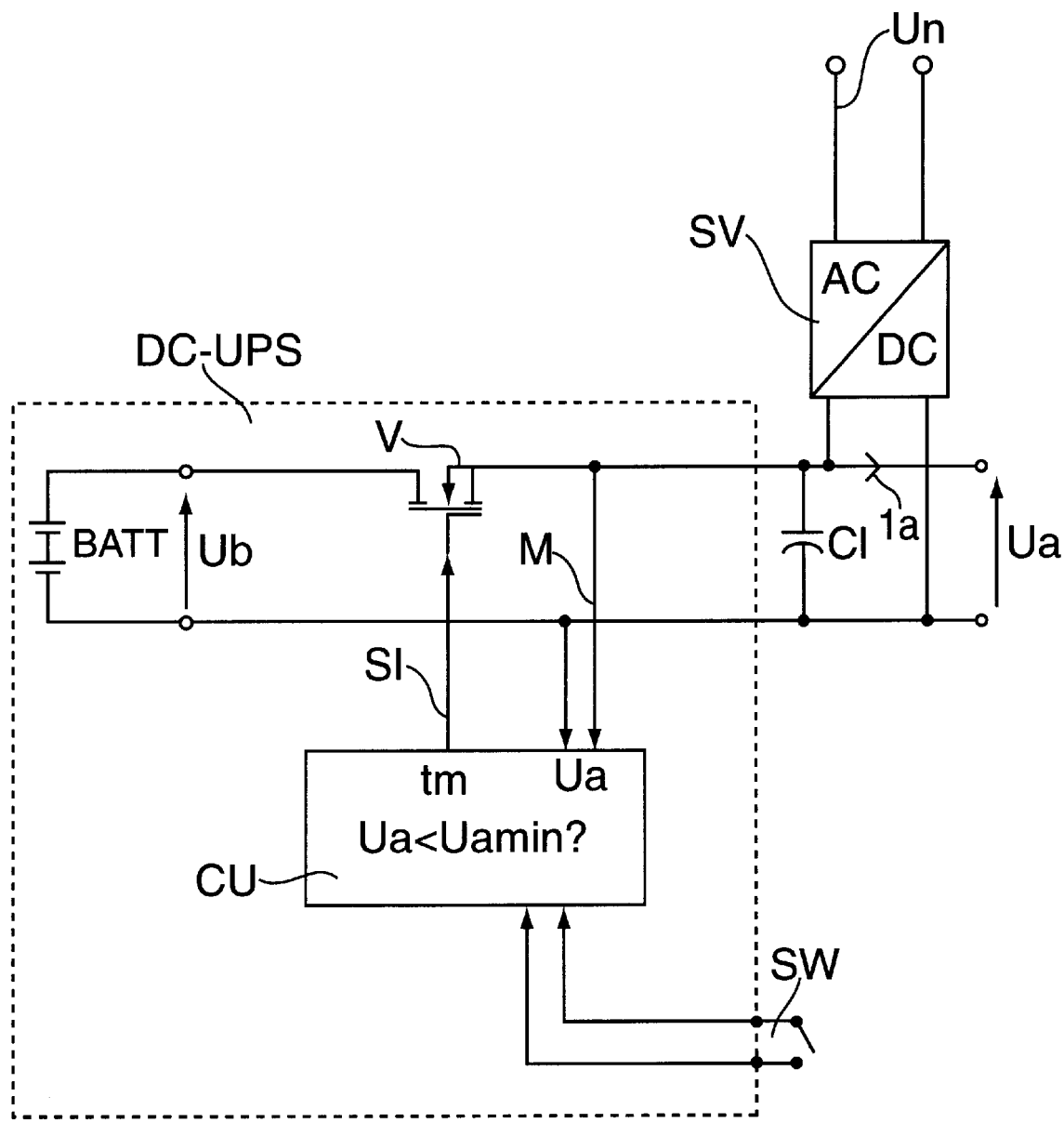
FIG. 1 shows a block diagram of a device according to the present invention.

The device according to the present invention, which is designated by the reference symbol DC-USV in the block diagram in FIG. 1, is used for backing up a DC voltage Ua at the output of a power supply SV. In the example in FIG.

1, this device is supplied on the power line system side by an AC voltage Un, so that the power supply SV represents an AC-DC module. In another embodiment of the present invention (not shown) the power supply can also be supplied from a mains system DC voltage.

The device according to the present invention includes at least one back-up battery BATT. This may also be a rechargeable battery which can be charged via the power supply SV itself. If the rechargeable battery is provided, then, means are additionally provided for systematic charging of the rechargeable battery, which means produce, for example, charging current limiting. These means are not illustrated in FIG. 1, for reasons of clarity, and may also be integrated in control unit CU there.

According to the present invention, the control unit CU connects the back-up battery BATT when the actual value of the DC voltage Ua is less than a predefined minimum value Uamin. This comparison is carried out by the control unit CU. If this comparison turns out positive, i.e., it is necessary to back-up the output DC voltage Ua, then the battery BATT is preferably connected by driving an electronic switching element V via a switching signal SI emitted by control unit CU. The output DC voltage Ua is then backed up by the battery and assumes the value of the currently available battery voltage Ub.

At the same time that the battery BATT is connected, a predefined back-up time period tm is generated in the control unit. The duration of the back-up time period is advantageously chosen to be short, preferably in the order of magnitude of seconds, for example with a value tm=1 s. After the back-up time period elapses, the back-up battery BATT is initially forcibly disconnected again. Should the output DC voltage again fall below the predefined minimum value Uamin, a sequence of such connection and disconnection cycles ensues until the output DC voltage no longer falls below the predefined minimum value Uamin as a result of the output DC voltage Ua having returned, and, consequently no further battery connection cycles are generated. The return of the output DC voltage Ua can be caused, for example, by the supplying power line system returning or the disappearance of a blocking condition in the interior of the power supply itself.

In the case of a practical example, the value of the directly monitored output DC voltage Ua of the power supply SV is +24 V DC. Here, the minimum value Uamin can be advantageously preset to +23 V DC. Thus, if the value of the output DC voltage Ua falls, for whatever reasons, by 1 V to less than 23 V, then the DC-USV back-up device connects the battery BATT, which has previously been charged by it, electronically to the output, virtually immediately. The minimum voltage which occurs on a load at the output thus in practice does not fall below the predefined minimum voltage value of, for example, 23 V DC, which is still considerably above the theoretical limit for low voltage, which is about 18.5 V. It is advantageous if the back-up battery BATT has a no-load voltage Ub which is greater than the nominal value Uanenn of the DC voltage Ua. If the nominal value of the output DC voltage Ua of the power supply SV is +24 V, this condition is satisfied, for example, by a back-up battery having a no-load voltage of about 27.3 V.

The possible return of the output voltage of the power supply can be identified in that, according to the present invention, the battery BATT is disconnected cyclically from the back-up device DC-USV at the end of each back-up time period tm, which back-up time periods tm preferably have a duration of about 1 second. The actual value of the DC voltage Ua present on the load is measured in such a pause between two back-up time periods tm. If the power supply is still not supplying any voltage, the output DC voltage Ua, whose value is that of the battery voltage, will fall within a short time during the disconnection phase to the predetermined minimum voltage value of, for example, 23 V DC. The back-up device DC-USV then automatically connects the battery to the loads again and a further back-up time period tm elapses. If, in contrast, the output voltage of the power supply returns before the back-up time period tm elapses, then the voltage no longer falls below the minimum voltage value Uamin after disconnection of the battery as the back-up time period runs out. As a rule, the output voltage Ua is then kept stable by the power supply at the level of the nominal value Uanenn, the battery is no longer connected and, if required, is charged again by the power supply SV.

The device according to the present invention is also fully functional if the failure of the output DC voltage of the power supply has been caused by the absence of any supplying input AC voltage. Here, a regulator in the interior of the power supply, which has the object of stabilizing the output DC voltage in normal operation, detects the actual value of the output DC voltage Ua, after the return of the input AC voltage which is less than the required value, during a pause time after the end of a back-up time period tm. Such a regulated power supply starts up automatically again when the supplying input voltage returns.

In many cases, the mains-operated (e.g., power-line operated) power supply SV has a capacitor C1 at the DC voltage output DC, which is charged by the back-up battery BATT during a back-up time period tm. This capacitor is discharged in accordance with Q=I×t=C×U, where du/dt= $I_{load\ current}/C$, in a pause time at the end of a back-up time period. If there is a failure in the output DC voltage Ua, the backed-up voltage Ua thus does not fall suddenly after the end of one of the cyclically successive back-up time periods, but decays with a time constant to the predefined minimum value Uamin. This has the advantage of preventing the pause times between the back-up time periods from becoming too short and, in some instances, preventing unacceptable switching spikes on the load.

Without the device according to the present invention, it is not easily possible to identify whether an output DC voltage, in particular such a voltage within the range of the nominal value, is being provided from a power supply, which is active again, or from the connected battery. The device in this case has the advantage that the return of the output DC voltage of the power supply can be identified effectively without major complexity. The battery can thus be disconnected from the loads quickly again after a fault has decayed and is not discharged unnecessarily. The present invention eliminates the need, for example, for a diode in the output circuit for DC voltage detection. The disadvantages linked to this of a forward voltage drop occurring, a high power loss and large amounts of space being required for heat sinks can be avoided.

The device according to the present invention has the further advantage that it is not necessary to provide any costly, space-consuming measures for direct detection of the supplying power line system voltage at the input of the power supply. In accordance with the present invention, the loads continue to be supplied both in the event of a failure of the supplying input voltage and in the event of a failure of the power supply itself, since the output DC voltage, which is essential for the loads, of the power supply and the load input voltage are monitored. The device according to the present invention can thus be connected additively downstream of a power supply, without any intervention in its design being necessary.

The device according to the present invention has the further advantage that it automatically connects the battery as a back-up even in the case of temporary dips in the output DC voltage of the power supply which are caused, for example, by high inrush currents of loads, as soon as the load voltage falls below a predetermined minimum value of, for example, 23 V DC. The present invention thus enables a virtually continuous transfer and back-up of the output DC voltage in a multiplicity of fault situations. Furthermore, as a result of the forcible disconnection according to the present invention at the end of a back-up time period, the battery can be disconnected very quickly in every case after normal output DC voltage conditions return. This avoids parallel operation of the power supply and battery which, under some circumstances, may last for a very long time and could otherwise not be ended until after the battery had gradually discharged after a relatively long time.

Furthermore, additional current is also supplied in the event of load short-circuits since, as a result of the monitoring of the output DC voltage, the battery is connected in every case as soon as this voltage falls below the predefined minimum value. In consequence, for selectivity purposes, automatic protection devices which are connected upstream of the loads can be tripped more quickly and more reliably. Here, the battery current is advantageously limited to a defined value of typically 120 A for t=20 ms by means of electronic short-circuit current limiting which is integrated in the back-up device.

The present invention will be explained in more detail with reference to two groups of voltage profiles which are illustrated in FIGS. 2a, 2b and 3a to 3c. Here, it is possible to distinguish, in principle, between the operating behavior of two types of power supply SV.

In the case of a first type, the regulator is equipped with an autonomous, internal auxiliary voltage supply, which is supplied from the power line system input voltage, for stabilizing the output DC voltage. This auxiliary voltage supply continuously keeps the regulator in a state of readiness even when the active output voltage Ua is above the required value Uanenn as a result of the connection of the battery BATT. The regulator is disconnected in a defined manner in the absence of a power line system input voltage.

In the case of a second type, an auxiliary supply in the form of a storage capacitor is provided for running up the regulator, by means of which auxiliary energy is made available for a specific time. After run-up has been completed, the storage capacitor is charged via a high-value resistor, for example from the power line system voltage, and the regulator is supplied via an auxiliary winding of the main transformer of the power supply. This second type of power supply has the disadvantage that there is also no stable supply of energy for the regulator in the absence of an input voltage. This results in a sequence of continual, unsuccessful attempts to run up the power supply SV in the situation in which the output DC voltage Ua is above the setpoint value because of the battery being connected.

Nevertheless, the device according to the present invention can be coupled to the output from both types. With both types, it is possible with aid of the back-up device according to the present invention to isolate the battery from the load quickly and in a manner which is simple and produces low power losses after the end of the actual back-up process, i.e., for example, after a power line system failure has ended or after dynamic load spikes have disappeared.

For further explanation, FIGS. 2a and 2b show the profiles of the essential voltages of the device according to the present invention during a back-up process, using the example of a power supply which, corresponding to the above first type, has an internal auxiliary voltage supply for the regulator of the output DC voltage.

Here, it is assumed according to FIG. 2a that the power line system which supplies the power supply fails at the instant t1 and returns at the instant t8. As a result of the failure at t1, the output DC voltage Ua falls according to FIG. 2b within a first back-up time period ts1 from Ua=Uanenn to Uamin, the voltage profile depending on the capacitance of the output capacitors of the power supply, and on the magnitude of the load current Ia. At this instant t2, the back-up device according to the present invention connects the battery BATT. As a consequence, Ua rises from Uamin to a value Ub−dU at the instant t3, Ub indicating the no-load voltage of the battery and dU indicating the voltage drop across a switch which activates the battery. As a result of the load, from t3 on, the battery voltage falls slightly below the no-load value Ub. In parallel with this, a back-up time period tm is generated at the instant t2.

After the end of tm at the instant t4, the battery is forcibly disconnected, and an additional back-up time period ts2 follows during which the output DC voltage Ua once again falls to Uamin. The battery is connected again at this instant t5, a further back-up time period tm is generated, which lasts until t7, and Ua rises once again to the value Ub−dU at instant t6. This sequence is continually repeated for as long as the power line system voltage Un does not return.

The power line system voltage Un returns at instant t8. Upon completion of the active back-up time period tm which is elapsing at this instant t8, the battery is permanently disconnected, automatically, at the instant t9. The output DC voltage Ua falls to Uanenn at the instant t10. From this instant on, the power supply takes over the further supplying of the load, and the regulator of the power supply keeps Ua as constant as possible at the value Uanenn. The battery remains disconnected, since the output DC voltage no longer falls to the predefined minimum value Uamin.

Particularly in the case of a long-lasting failure of the power supply, it is possible for a special case to occur in which the battery is discharged to such an extent and the actual value of the DC voltage Ua, which corresponds to the battery voltage Ub, no longer exceeds the minimum value Uamin during one of the many following back-up time periods tm. Here, it is advantageous for back-up time periods tm to no longer be generated by the control unit CU and, consequently, for the back-up battery to no longer be disconnected when, after being connected, the actual value of the DC voltage Ua remains less than the predefined minimum value Uamin. The back-up battery BATT is advantageously disconnected again by a separate logic device in the control unit CU when back-up time periods tm are no longer being generated and the actual value of the DC voltage Ua is again greater than the predefined minimum value Uamin.

The load on the battery during the back-up times tm results in the battery gradually being discharged. Its no-load voltage Ub and the value of the output DC voltage Ua=Ub−dU which occurs during the back-up time periods fall slowly. This process cannot be illustrated in FIGS. 2a, 2b, 3a, 3b, 3c, for reasons of clarity.

Finally, in a manner comparable to FIGS. 2a and 2b, FIGS. 3a to 3c show the profiles of the essential voltages of the device according to the present invention during a back-up process using the example of a power supply which, corresponding to the above second type, has a storage capacitor for the auxiliary voltage supply for the running up the regulator of the output DC voltage.

Here, the sequence in FIGS. 3a and 3b corresponds, up to and including the instant t8, to that in FIGS. 2a and 2b. FIG. 3c is included, in addition, and shows the profile of an auxiliary voltage Uh which is used to supply a regulator in the power supply.

From instant t8 on, which designates, for example, the return of a power line system voltage which supplies the power supply, or the end of a condition which blocks the power supply, auxiliary voltage Uh rises from 0 to a threshold value Ustart. This is achieved by charging a storage capacitor via a resistor in the power supply. The regulator of the power supply starts to operate on reaching this threshold at instant t9. The arrow, which is continued from FIGS. 3c to 3a at t9 and is illustrated in the form of a dotted line shows that a back-up time tm is active at the moment. Since, as a result of the unchanged connection of the battery, the output DC voltage Ua at instant t9 is still greater than Uanenn, although the regulator discharges the storage capacitor, the power supply cannot, however, run up. The regulator is stopped when Uh=Ustop at instant t11, and the charging of the storage capacitor starts again. This is due to the fact that the output DC voltage Ua is still greater than Uanenn at this instant t11, although the back-up time period tm ended at the instant t9 before this, the battery has been disconnected and, as a consequence of this, Ua drops.

The sequences "start/end of back-up time periods tm" and the connection/disconnection of the battery linked to this as well as "regulator start/stop" initially run asynchronously with respect to one another after the power line system voltage Un returns. This is indicated in FIGS. 3b and 3c by instants t12, t13 and by the double wavy lines after them. The asynchronicity does not end until the conditions "regulator operating" and Uamin<Ua<Uanenn coincide. This is the case at instant t15 in the example in FIGS. 3b and 3c. Since Ua is now<Uanenn, the regulator has a virtual "regulation requirement" and continues to operate. As a consequence of this, the output DC voltage Ua no longer falls further to Uamin but, driven by the power line system voltage Un which has returned, is increased to Uanenn at instant t16. The battery is thus no longer connected since it is no longer possible for the voltage to fall below Uamin. In addition, from t15 on, the auxiliary voltage Uh of the regulator exceeds the upper threshold Ustart until the storage capacitor is completely charged.

In practice, it has been found that, on average, the power supply runs up and the battery remains disconnected after completion of about 5 back-up time periods tm, following the return of the power line system voltage and/or cancellation of a condition which interrupts the operation of the power supply at instant t8 in the example in FIG. 3c.

The no-load voltage Ub and capacity of the back-up battery BATT are advantageously selected such that the battery voltage Ub=Ua is discharged, during a back-up time period tm when a load current Ia is present which is approximately within the range of the nominal value, only to a voltage value which is preferably considerably above the nominal value Uanom of the DC voltage Ua. In practice, this condition can be satisfied if the no-load voltage Ub of the battery BATT has a value of at least 27 V when Uanenn=24 V.

What is claimed is:

1. A device for backing-up a DC voltage at a DC voltage output of a power-line operated power supply, the power supply supplying power to a load, the device comprising at least one back-up battery; and a control unit performing the following functions:
comparing an actual value of the DC voltage at the DC voltage output to a predetermined minimum value,
connecting the at least one back-up battery to the DC voltage output of the power supply when an actual value of the DC voltage is less than the predetermined minimum value, the at least one connected back-up battery providing a battery voltage which, together with the DC voltage at the DC voltage output of the power supply, supplies the power to the load,
determining a predetermined back-up time period,
disconnecting the at least one connected back-up battery from the DC voltage output of the power supply after the predetermined back-up time period expires, and
repeating a comparison of the actual value of the DC voltage to the predetermined minimum value.

2. The device according to claim 1, wherein, after the at least one back-up battery is connected to the DC voltage output and the actual value of the DC voltage is less than the predetermined minimum value, the control unit discontinues a determination of the predetermined back-up time period and maintains a connection of the at least one back-up battery to the load.

3. The device according to claim 2, wherein after the control unit discontinues determining the predetermined back-up time period and the actual value of the DC voltage is greater than the predetermined minimum value, the control unit disconnects the back-up battery from the DC voltage output.

4. The device according to claim 1, wherein a no-load voltage of the at least one back-up battery is greater than a nominal value of the DC voltage.

5. The device according to claim 4, wherein the at least one back-up battery is discharged only to a voltage value higher than the nominal value of the DC voltage during the predetermined back-up time period in response to a load current that is substantially within a range of the nominal value of the DC voltage.

6. The device according to claim 1, wherein the power supply includes a capacitor at the DC voltage output, and the capacitor being charged by the at least one back-up battery during the predetermined back-up time period.

7. The device according to claim 1, wherein the at least one back-up battery is connected to the DC voltage output without disconnecting the DC voltage output from the load.

8. The device according to claim 1,
wherein, when the control unit disconnects the back-up battery from the DC voltage output, the control unit measures the DC voltage to generate a measurement value, and
wherein the control unit determines if the back-up battery is to be reconnected to the DC voltage output as a function of the measurement value.

* * * * *